M. HAUPT.
DRIVING AXLE.
APPLICATION FILED AUG. 31, 1918.
1,316,232.
Patented Sept. 16, 1919.
2 SHEETS—SHEET 2.
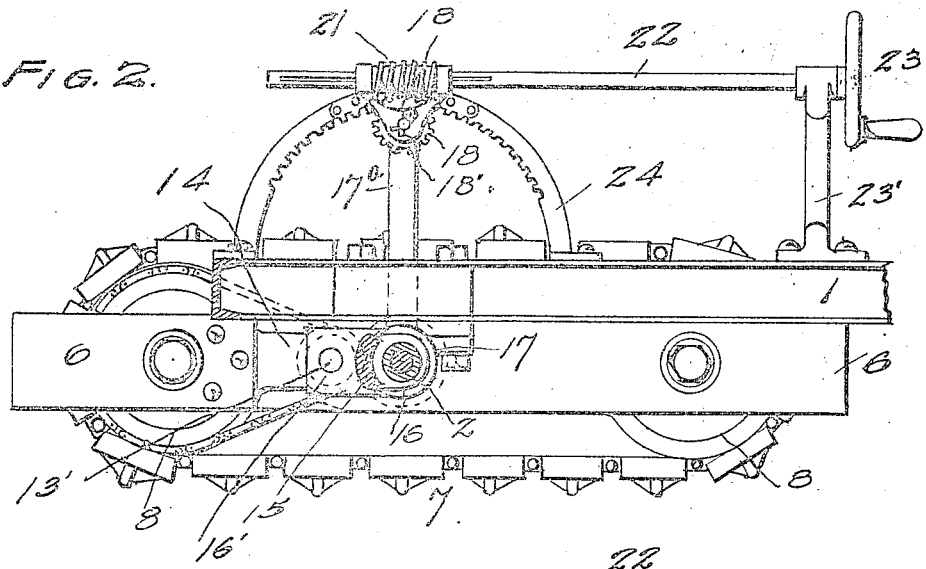
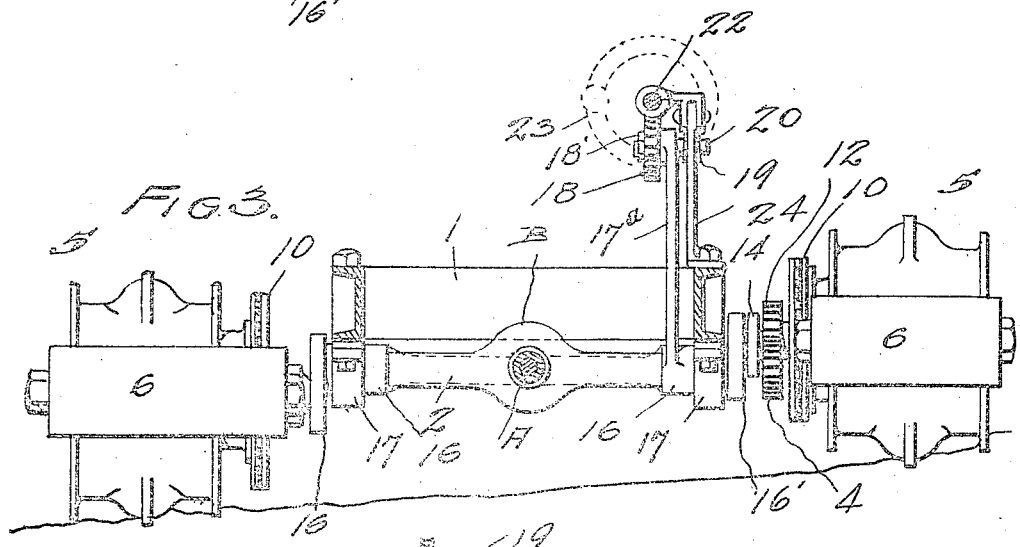
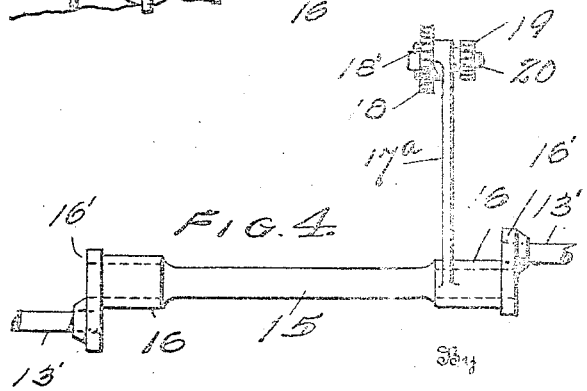
Inventor
Mathias Haupt
Herbert E. Smith
Attorney

UNITED STATES PATENT OFFICE.

MATHIAS HAUPT, OF SPOKANE, WASHINGTON.

DRIVING-AXLE.

1,316,232.   Specification of Letters Patent.   Patented Sept. 16, 1919.

Application filed August 31, 1918. Serial No. 252,243.

*To all whom it may concern:*

Be it known that I, MATHIAS HAUPT, a citizen of the United States, residing at Spokane, in the county of Spokane and State of Washington, have invented certain new and useful Improvements in Driving-Axles, of which the following is a specification.

The present invention relates to improvements in body leveling devices especially designed for use on motor vehicles of the tractor type and particularly applied to the caterpillar form of traction wheel. The primary object of the invention is the provision of a simple device for adapting the traction wheels or caterpillars of the motor vehicle or tractor to different levels so that the tractor may be employed for work on steep side hills especially in plowing, and in which the center of gravity of the tractor is properly maintained and the tractor may be steered with facility.

The invention consists essentially in certain novel combinations and arrangements of parts whereby the oppositely disposed traction devices or wheels are raised or lowered with relation to the body or frame of the tractor, as will be hereinafter more specifically described and claimed.

In the accompanying drawings one complete example of the physical embodiment of the invention is illustrated, constructed and arranged according to the best mode, so far devised for the practical application of the principles of the invention. Alterations and changes may be made, and are contemplated, in the size, shapes and forms of some of the elements, but all within the scope of the appended claims.

Fig. 2 is a longitudinal sectional view of the apparatus of Fig. 1 on line 2—2.

Fig. 3 is a transverse view on line 3—3 of Fig. 1.

Fig. 4 is a detail plan view of the crank shaft for operating the leveling devices.

Figure 1:
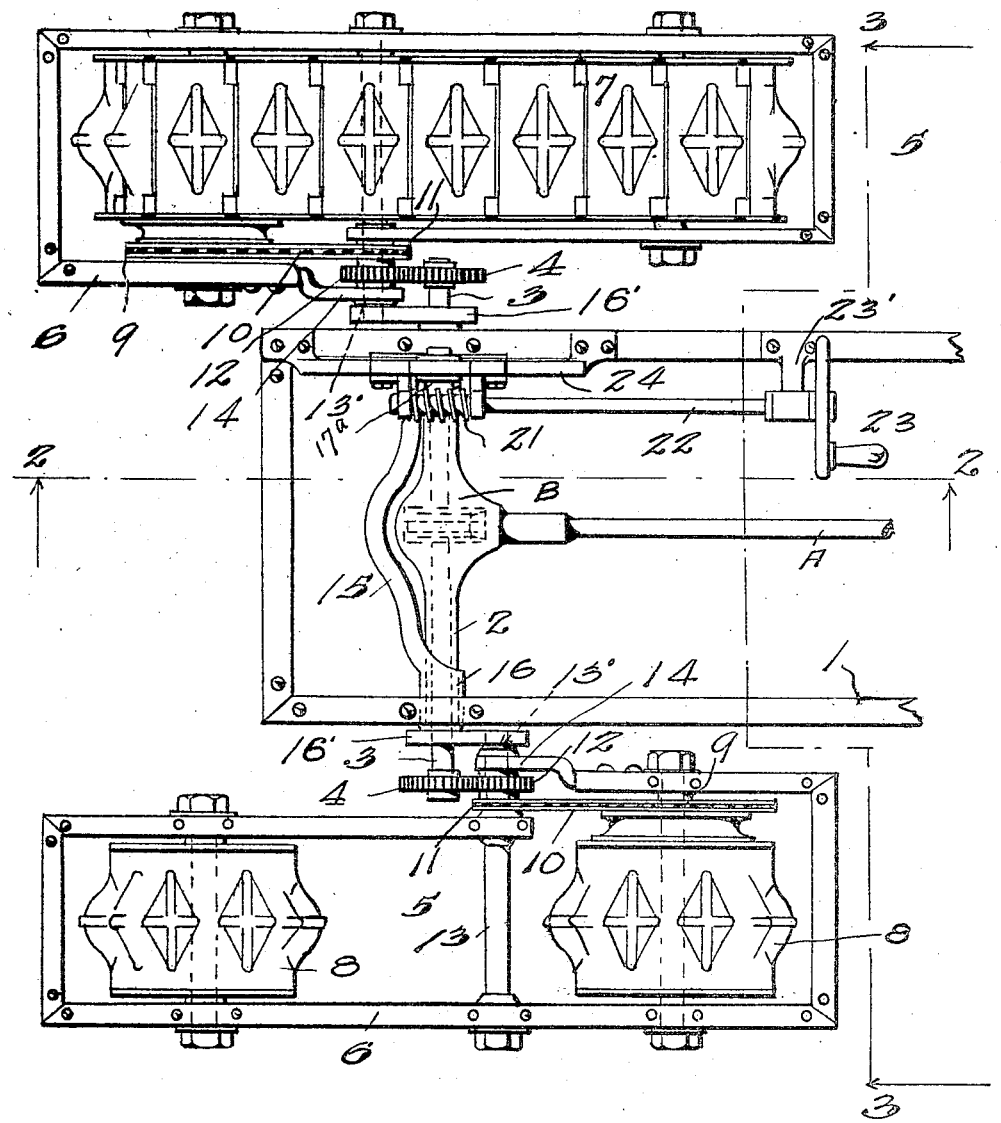
Figure 1 is a top plan view of so much of a tractor as is necessary to illustrate the application thereto of the physical embodiment of the invention.

In the preferred form of the invention as illustrated in the drawings, the usual rectangular metallic frame 1 is employed, preferably made of channel irons, and in connection with the driving shaft A of the motor vehicle, the axle casing 2 is projected transversely from the differential casing B, and the usual, sectional shaft 3 is arranged in the transverse shaft or axle casing 3, and provided with the end driving gears 4, 4.

The traction devices for driving the motor vehicle or tractor are indicated as a whole as 5, 5, located one at each side of the frame 1, at the rear, and including the rectangular, metallic frames 6, 6, made up of suitable material in proper shapes, to support the traction belts 7, 7, that are of usual type employing links flexibly connected together and adapted to travel over the surface of the ground, around the wheels 8, 8.

One of each of the pairs of wheels 8, at the sides of the frame 1, is provided with a large sprocket portion 9 for the sprocket chain 10 that receives power from the small sprocket 11 driven from the driving gear 4 through the medium of the gear 12 on the extension 13' of the shaft 13, which latter is mounted between the two side arms of the rectangular frames 6, of the traction devices. Thus, the power of the motor of the tractor is applied through the driving devices of the motor vehicle, through the gearing 4—12 and thence through the sprocket driving devices to the traction belts 7.

The leveling apparatus for the vehicle requires the utilization of a crank shaft 15, the body portion of which is fashioned to conform to the shape and outline of the differential gear case B and the rear axle casing 2, the shaft 15, lying normally parallel with and at the rear of the axle casing, as in Fig. 1. At its ends the shaft is formed with a pair of alined sleeves or tubular members 16 which incase axle casing 2 at its ends, and these sleeves are journaled at 17 in bearings attached to the frame 1, which bearings also serve to support the axle and casing. The extreme ends of the crank shaft are provided with oppositely disposed crank arms 16', and these arms at the free ends, receive the extensions 13' of the shaft 13 of the traction devices. Thus, when the crank shaft 15 is rocked or revolved in its bearing blocks 17, 17, the crank arms 16' are swung upwardly and downwardly, respectively, to change the relation of the caterpillar traction devices with regard to the frame 1 and to change the altitude of the devices with relation to each other.

The crank shaft or rock shaft 15 is turned through the instrumentality of a rocker arm 17ª which rises vertically from one of the bearing sleeves 16 of the rocker shaft, and has at its upper, free end, a rack wheel 18 which is loose with relation to the arm, being secured thereto by the pin 18'. A stub shaft 20 is passed through the end of the arm with a pinion 19 thereon and the shaft with its two wheels 18 and 19 revolve together through the instrumentality of the worm screw 21 in mesh with the rack or worm wheel 18. The worm screw is turned by the shaft 22 and hand wheel 23, and the pinion 19 travels in the teeth of the curved rack arm 24 bolted to the top of the frame 1. The operation of the leveling device will be apparent, as the hand wheel 23 is turned the rocker arm 17ª is turned on its pivot bearings and the traction devices are raised and lowered respectively, the pinion 19 in the rack arm 24 holding the parts in adjusted position, as will be understood.

Claims:—

1. In a vehicle body leveling device, the combination with a main frame and a transverse rock shaft journaled therein and having rock arms, of traction devices on the rock arms, a lever arm for the rock shaft, driving means for said traction devices extending through the ends of said rock shaft and engaging the traction device, and mechanism for swinging said lever arm holding it in adjusted position.

2. In a vehicle body leveling device, the combination with a main frame and a transverse rock shaft journaled therein and provided with oppositely disposed rock arms, of traction devices at the sides of the frame having supporting shafts journaled in the rock arms, a lever arm on the rock shaft, mechanism for swinging the lever arm and holding it in adjusted position, and driving means for said traction devices extending through the end of said rock shaft, driving gears on said rock arms engaging therewith and engaging the traction devices as described.

3. In a vehicle body leveling device, the combination with a main frame and a transverse rock shaft having end sleeves and journal bearings for the sleeves, rock arms on the shaft and means for rocking the shaft, a traction device at each side of the frame having a supporting shaft coöperatively connected with a rock arm, and driving mechanism for the traction devices supported in said end sleeves.

4. In a vehicle body leveling device, the combination with a main frame and a rock shaft having end sleeves and journal bearings therefor, rock arms on the shaft and a rock lever therefor, a traction device operatively supported from each arm and driving means for said devices supported in said sleeves, and means for operating the lever as described.

In testimony whereof I affix my signature.

MATHIAS HAUPT.